(12) United States Patent
Zhou et al.

(10) Patent No.: US 10,205,929 B1
(45) Date of Patent: Feb. 12, 2019

(54) METHODS AND SYSTEMS FOR CREATING REAL-TIME THREE-DIMENSIONAL (3D) OBJECTS FROM TWO-DIMENSIONAL (2D) IMAGES

(71) Applicant: Vuu Technologies LLC, Jersey City, NJ (US)

(72) Inventors: Xin Zhou, Jersey City, NJ (US); James Matthews, Jr., Stony Brook, NY (US)

(73) Assignee: Vuu Technologies LLC, Jersey City, NJ (US)

( * ) Notice: Subject to any disclaimer, the term of this patent is extended or adjusted under 35 U.S.C. 154(b) by 180 days.

(21) Appl. No.: 15/205,935

(22) Filed: Jul. 8, 2016

Related U.S. Application Data

(60) Provisional application No. 62/190,146, filed on Jul. 8, 2015.

(51) Int. Cl.
  *H04N 13/243* (2018.01)
  *G06T 7/00* (2017.01)

(52) U.S. Cl.
  CPC ......... *H04N 13/243* (2018.05); *G06T 7/0024* (2013.01)

(58) Field of Classification Search
  CPC .................. H04N 13/0242; G06T 7/0024
  See application file for complete search history.

(56) References Cited

U.S. PATENT DOCUMENTS

| | | | | |
|---|---|---|---|---|
| 6,407,736 B1* | 6/2002 | Regan | ................ | G06T 15/005 345/422 |
| 2002/0024593 A1* | 2/2002 | Bouguet | ............ | G01B 11/2504 348/46 |
| 2002/0050988 A1* | 5/2002 | Petrov | ..................... | G06K 9/20 345/418 |
| 2003/0071194 A1* | 4/2003 | Mueller | ................ | G01B 11/00 250/208.1 |
| 2008/0246757 A1* | 10/2008 | Ito | ......................... | G06T 15/10 345/419 |

(Continued)

OTHER PUBLICATIONS

CaprileB. et al. "Using vanishing points for camera-calibration," International Journal of Computer Vision, vol. 4, p. 127-140 (1990).

(Continued)

*Primary Examiner* — Jefferey F Harold
*Assistant Examiner* — Sean N. Haiem
(74) *Attorney, Agent, or Firm* — Cooley LLP

(57) ABSTRACT

An example method for determining three-dimensional coordinates of an object from a plurality of two-dimensional images may include: acquiring two-dimensional input frames via a camera, the camera being associated with one or more calibration parameters; isolating a contour of at least one object contained within each input frame; calculating coordinates of one or more visual rays corresponding to each contour in a direction specified by at least one of the calibration parameters; estimating a spatial tangent vector of each contour using finite differences; estimating a tangent space of the visual rays at each visual ray; calculating epipolar numbers based on basis vectors of the tangent space, the one or more calibration parameters, and the tangent vector; forming a line-based epipolar matrix using the epipolar numbers and line coordinates; and de-homogenizing the column space of the matrix into object points.

20 Claims, 21 Drawing Sheets

(56) References Cited

U.S. PATENT DOCUMENTS

| | | | | |
|---|---|---|---|---|
| 2010/0305857 | A1* | 12/2010 | Byrne | G06T 7/73 |
| | | | | 701/301 |
| 2014/0002617 | A1* | 1/2014 | Zhang | H04N 13/0242 |
| | | | | 13/242 |
| 2015/0260509 | A1* | 9/2015 | Kofman | G01B 11/2504 |
| | | | | 356/601 |
| 2016/0288330 | A1* | 10/2016 | Konolige | B25J 9/1697 |

OTHER PUBLICATIONS

Cipolla, R. et al. "Camera calibration from vanishing points in images of architectural scenes," BMVC, p. 382-391 (1999).
Faugeras O. et al. "On the geometry and algebra of point and line correspondences between N images," INRIA, p. 951-956 (1995).
Hartley R. "Projective reconstruction from line correspondences," GE—Corporate Research and Development, p. 903-907 (1994).

* cited by examiner

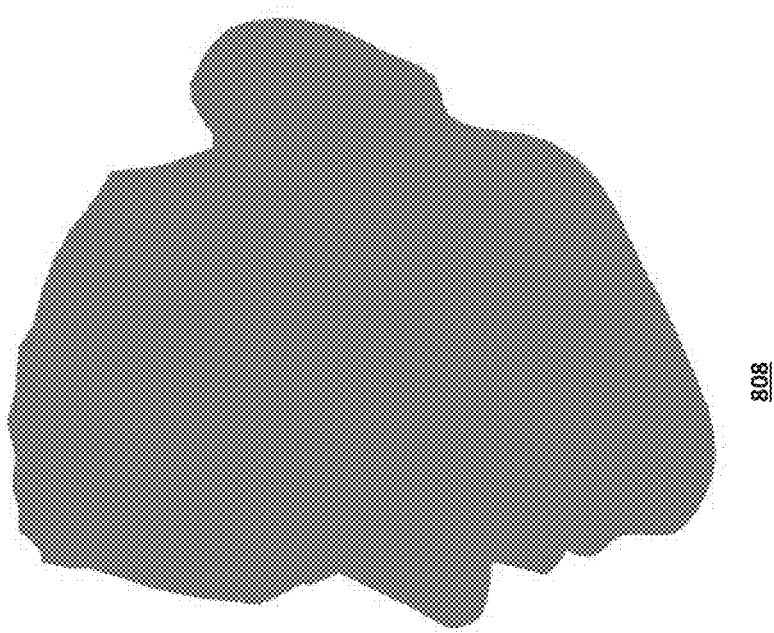

METHODS AND SYSTEMS FOR CREATING REAL-TIME THREE-DIMENSIONAL (3D) OBJECTS FROM TWO-DIMENSIONAL (2D) IMAGES

CROSS-REFERENCE TO RELATED APPLICATIONS

This application claims priority to, and the benefit of, Provisional application Ser. No. 62/190,146, filed Jul. 8, 2015 and entitled, "METHODS AND SYSTEMS FOR CREATING REAL-TIME THREE-DIMENSIONAL (3D) OBJECTS FROM TWO-DIMENSIONAL (2D) IMAGES." The entire contents of the aforementioned application are herein expressly incorporated by reference.

FIELD OF THE INVENTION

Embodiments of the present disclosure relate to methods and systems for creating 3D objects from two-dimensional images in real-time.

SUMMARY OF SOME OF THE EMBODIMENTS

Embodiments of this disclosure present systems, methods and devices which create an asymptotically-exact structure of objects in real-time from motion and occluding contours of the objects.

In some embodiments, a method for determining three-dimensional coordinates of an object from a plurality of two-dimensional images is provided and may include one or more (and in some embodiments, several, and in still other embodiments, all) of the following steps: acquiring a plurality of two-dimensional input frames via a camera, where the camera is associated with one or more calibration parameters, isolating a contour of at least one object contained within each input frame, calculating coordinates of one or more visual rays corresponding to each contour in a direction specified by at least one of the calibration parameters, estimating a spatial tangent vector of each contour using finite differences, estimating a tangent space of the visual rays at each visual ray, calculating epipolar numbers based on basis vectors of the tangent space, the one or more calibration parameters, and the tangent vector, forming a line-based epipolar matrix using the epipolar numbers and line coordinates, and de-homogenizing the column space of the matrix into object points. In still other embodiments, the object points are plotted (either on a display device or a printer—including a three-dimensional (3D) printer) to form the three dimensional object.

The above-noted embodiments may include one and/or another of the following features:

determining the calibration parameters of the camera/imaging device, where the calibration parameters can be determined using an auto-calibration scheme such as visual and/or r-sensor fusion methods;

the calibration parameters may be determined from at least one of one or more global-positioning sensors and one or more gyroscopes associated with the camera;

the calibration parameters may be determined according to information output from at least one of one or more gyroscopes associated with the camera and an active local sensor network;

the calibration parameters or a pose matrix may be determined with a combination of sensors, such as one or more of a step sensor, a step counter, a gyroscope, an orientation sensor, and GPS;

each contour may be obtained via an edge detection filter, where the edge detection filter may comprise a Canny filter, or an image or video segmentation algorithm;

each contour comprises a plurality of boundary points of the object in each two-dimensional input frame;

each contour comprises a boundary between at least one of colored regions and textured regions of a surface of the object;

each contour comprises at least one edge of a surface of the object in each two-dimensional input frame;

screening out points of discontinuity of each special tangent vector;

screening out points of discontinuity of the tangent space;

estimating the tangent space of the visual rays comprises determining finite differences;

estimating the tangent space of the visual rays further comprises performing principal component analysis;

estimating the tangent space of the visual rays further comprises performing multiple linear regression;

the two-dimensional input frames comprise a sequence of frames of video data;

applying one or more data processing methods, including but not limited to data cleaning, filtering, regression, inverse transformations, Radon transformations, to one or more of the above steps;

determining surface parameterizations jointly with, or independently of, the calculation of three-dimensional coordinates of discrete object points;

determining edge or curve parameterizations jointly with, or independently of, the calculation of three-dimensional coordinates of discrete object points; and Use the above parametrization for surface meshing and projection of textures.

In some embodiments, a method for autonomous vehicle navigation is provided and may comprise collecting a plurality of images around the vicinity of the vehicle, and, substantially in real-time with the collecting of images, processing the images and reconstructing objects in 3D within the vicinity and/or soon to be vicinity according to any one or more of the embodiments and additional features noted above in paragraphs or otherwise disclosed herein.

In some embodiments, a method for robotic movement/locomotion is provided and comprises collecting a plurality of images around the vicinity of a robot, and, substantially in real-time with the collecting and/or processing of the images, reconstructing objects in 3D within the vicinity and/or soon to be vicinity according to any one or more of the embodiments and additional features noted above in paragraphs or otherwise disclosed herein.

In some embodiments, a method for 3D scanning is provided and comprises collecting a plurality of images along an image path around an object, and, substantially in real-time with the collecting and/or processing of the images, reconstructing objects in 3D any one or more of the embodiments and additional features noted above in paragraphs or otherwise disclosed herein.

In some embodiments, a system is provided which is configured to perform the method according to any one and/or another of the method embodiments disclosed herein, or one and/or another of the steps recited therein, the system comprising at least one computer processor having computer instructions operating thereon to perform any one or more of the noted methods and/or steps.

In some embodiments, a computer readable medium is provided which includes computer instructions configured to cause at least one computer processor to perform the method of one and/or another of the method embodiments disclosed herein, and/or only one and/or another of the steps recited therein.

In some embodiments, a method for determining three-dimensional coordinates of an object from a plurality of two-dimensional images is provided and comprises acquiring a plurality of two-dimensional input frames along a path, acquiring one or more parameters of the camera so as to locate the camera relative to one or more objects contained in the frames, isolating a contour of at least one object contained within each input frame along one or more visual rays, determining 3D points of each contour of the object based on the plurality of contours and optionally additionally on one or more of the parameters, and reconstructing a model of the object using the 3D points.

These and other embodiments, objects, advantages, and features will become even clearer with reference to attached drawings and detailed description.

BRIEF DESCRIPTION OF SOME OF THE EMBODIMENTS

The patent or application file contains at least one drawing executed in color. Copies of this patent or patent application publication with color drawing(s) will be provided by the Office upon request and payment of the necessary fee.

FIGS. 8A-E illustrate a series of example frames, according to some embodiments.

Figure 5:
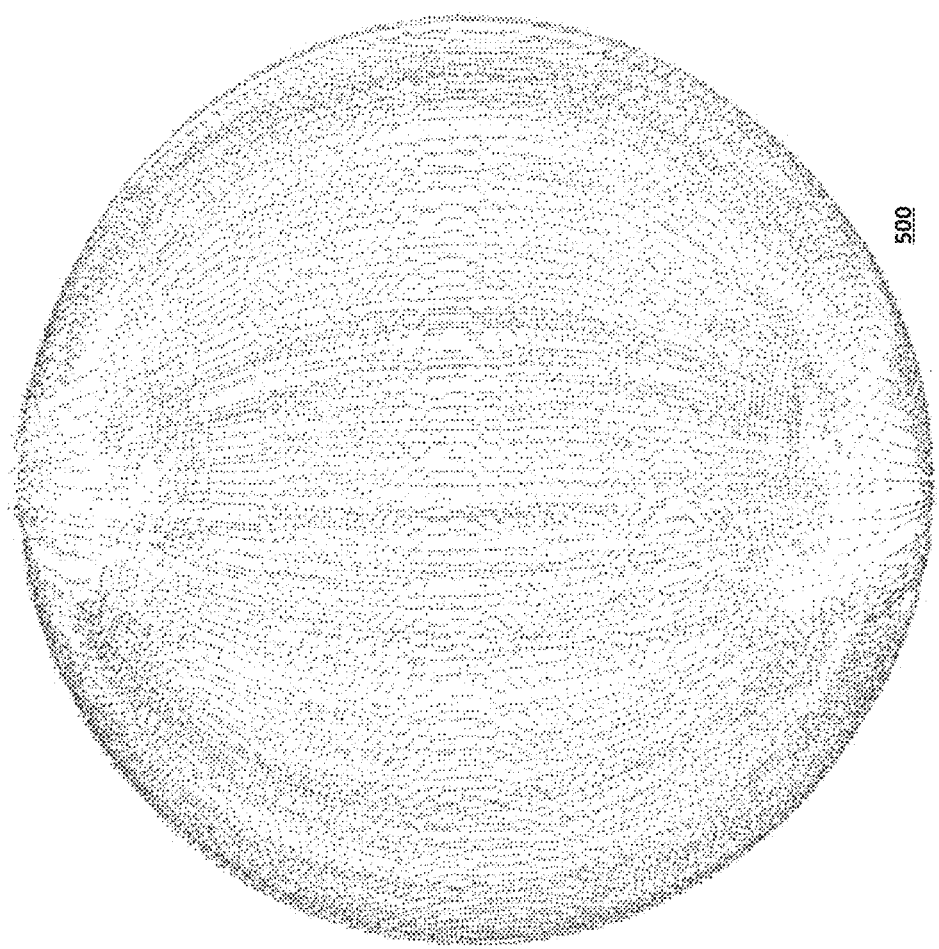
FIG. 5 is an illustration depicting detail of the reconstructed points of the object of FIGS. 1 to 4, according to some embodiments.

FIGS. 9A-E illustrate a series of example contours corresponding to the frames from FIG. 5, according to some embodiments.

Figure 10A:
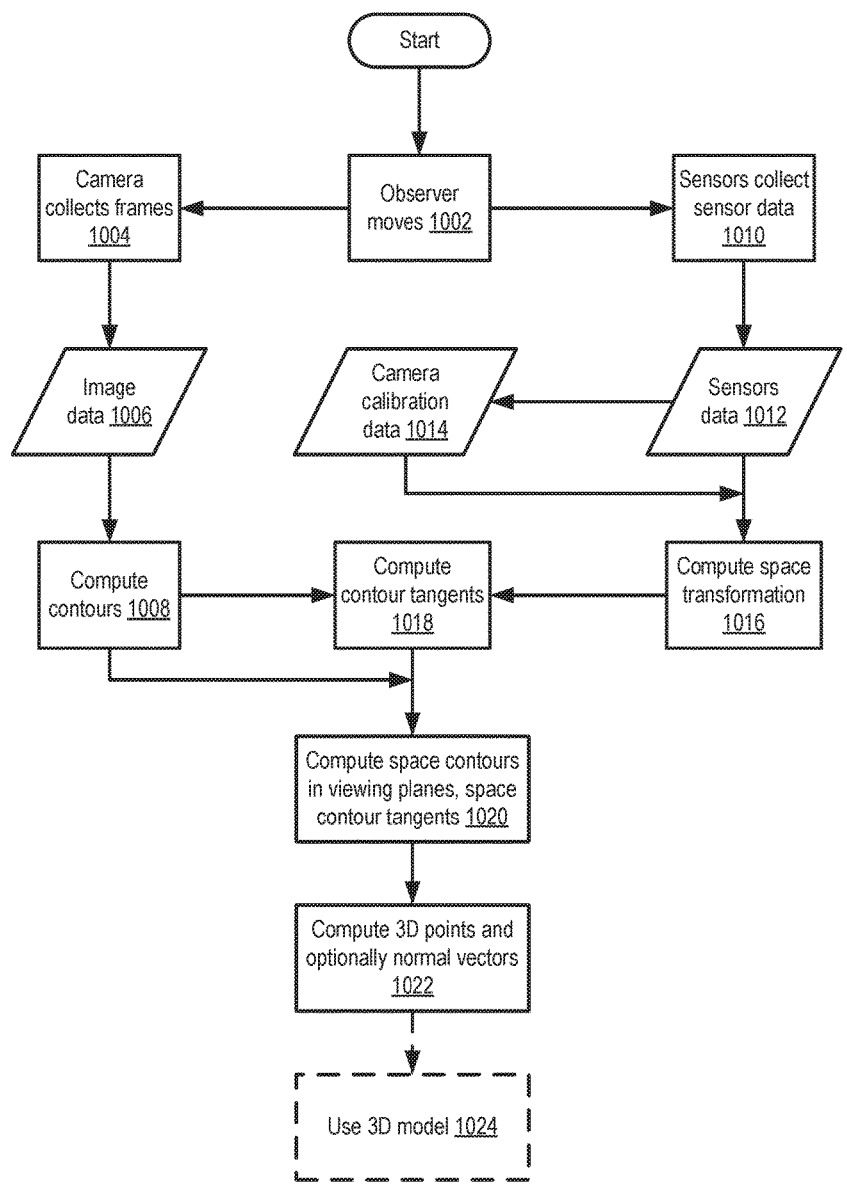

FIG. 10A is a logic flow diagram illustrating computing contours of a space, according to some embodiments.

Figure 10B:
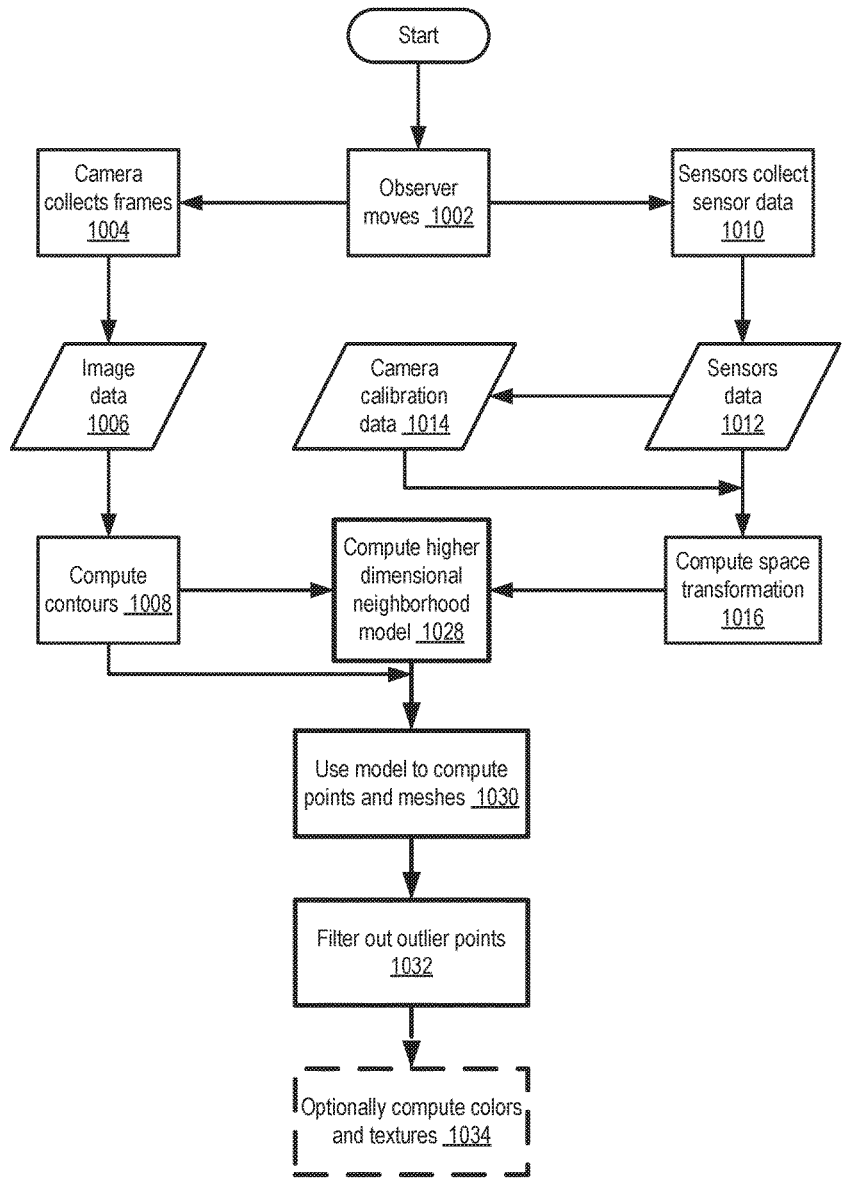

FIG. 10B is a logic flow diagram illustrating computing a high-dimensional neighborhood model for a space, according to some embodiments.

Figure 11:
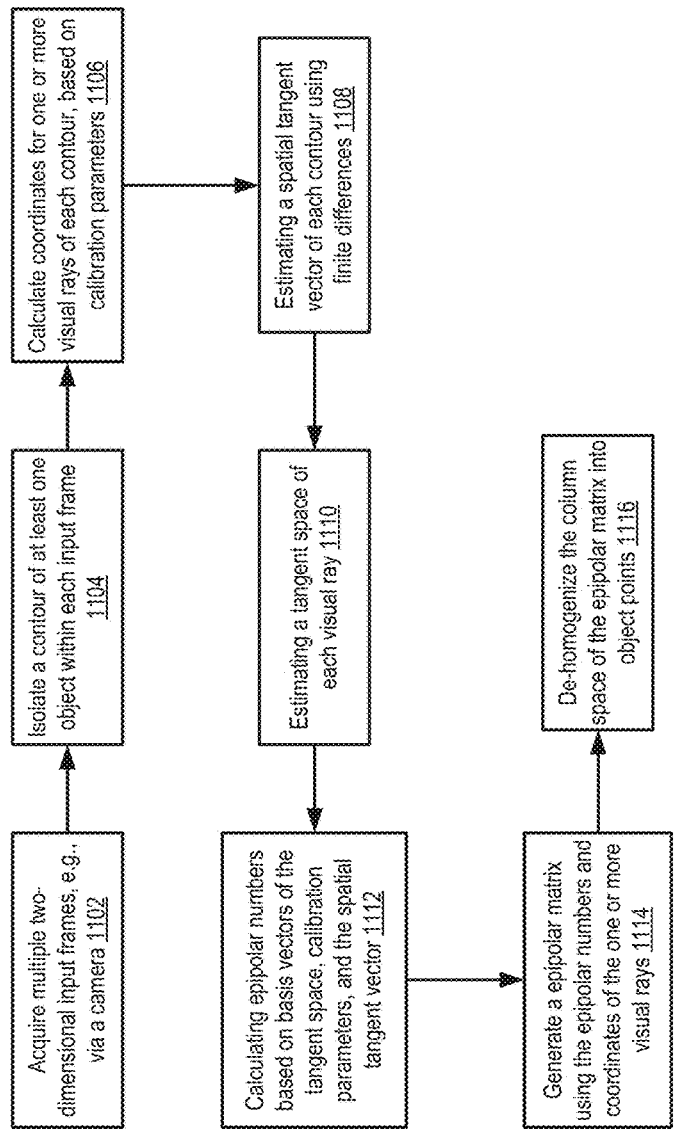

FIG. 11 is a logic flow diagram illustrating generating a surface mesh, according to some embodiments.

Figure 12:
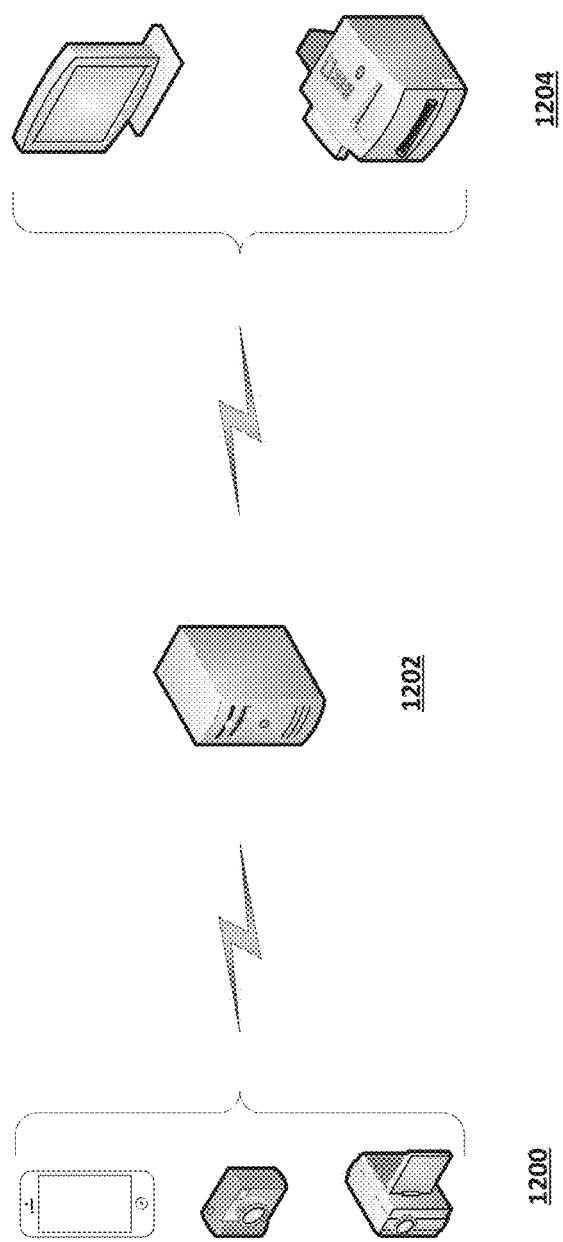

FIG. 12 is a data flow illustrating observing devices, a server device, and output devices, according to some embodiments.

DESCRIPTION OF SOME OF THE EMBODIMENTS

In some embodiments, three-dimensional structures may be reconstructed based on a plurality of two-dimensional visual images. This may be referred to as "Structure from Motion," or "SfM" and the three-dimensional structures may be formed based on occlusions. Thus, a three-dimensional structure can be formed based on contours determined from a plurality of two-dimensional images. This process can generate an exact three-dimensional model that is rendered substantially in real time (i.e., either real-time or near real-time).

In some embodiments, a sequence of frames, such as frames from video data, can be captured. For example, the video data may include a series of optical images. The images may be obtained from a thermal imaging device, a texture imaging device, and/or a similar imaging device (hereinafter collectively referred to as a camera). Each image can correlate to a frame of the video data, such that the series of optical images can correlate to a set of captured frames. A collective set of captured frames may be from a predetermined time interval of a video, for example, by time interval, e.g., one every second, every 3 seconds, or every ½ second, etc.

In some embodiments, the order of the frames can be chosen based on geometric proximity. For example, the temporal order of the frames captured along the trajectory may not be essential to the algorithm. Thus, the frames may not be collected at the same time, and can be obtained from different devices and/or users. Because data from different devices may be used, images can be sourced from social, cloud applications, and/or other applications, and can include images from different people taken at different times.

An edge detection algorithm may be used to detect boundary points of one or more objects within each frame. For example, an edge detection, image segmentation, video segmentation, and/or a similar algorithm may be used to isolate edges of objects distinguishable by, for example, color and/or texture boundaries, contained in the frames. Such edge detection may be via at least one of, for example, a Canny filter and image-segmentation, and/or any other known edge detection algorithm(s). Such image-segmentation may comprise Chan-Vese and/or Mumford-Shah image segmentation. The boundary points and/or edges can be used to determine contours of an object when viewed from a particular viewpoint (i.e., visual ray). Each contour may be akin to a profile of the object as seen from that view point (i.e., visual ray). The terms "profile" and "contours", at least in some embodiments, can be used interchangeably in the present disclosure.

In some embodiments, only the boundary points and/or edges of an object are detected; however in other embodiments, features within an object can also be detected. Accordingly, various filters (e.g., one or more color filters), such as those used to distinguish the boundaries of an object, can be used to isolate object features.

The two-dimensional (2D) boundary points may be converted into three-dimensional (3D) coordinates of an object, which can then be plotted to form a 3D model of the object. In addition to the boundary points and/or edges of objects determined from the 2D images, three-dimensional coordinates for the object can also be calculated based on image points of one-dimensional features, and/or camera parameters (e.g., calibration parameters such as focal length, and/or distortion). Moreover, the precision of the 3D model created according to some embodiments may be determined based on a precision factor, such as a mesh-size asymptotic limit.

In some embodiments, the camera parameters used to determine the three-dimensional coordinates may include data output from GPS sensors, gyroscopes, an active local sensor network, and/or the like. Additional sensors may also be used, including one or more of a step sensor, a step counter, a gyroscope, and an orientation sensor. Such functionality/sensors may be provided with the camera. For example, images from a smartphone may be used, and parameters may be drawn from other smartphone features, including a gyroscope, an accelerometer, a GPS sensor, an electronic compass, and/or the like. A local sensor network (e.g., a Wi-Fi, Bluetooth, cellular, and/or similar network) can be used to determine camera location/coordinates using, for example, triangulation and/or other algorithms for determining precise geolocation coordinates for the camera. In some embodiments, this can be combined with coordinates determined via point correspondences, feature tracking, and depth estimates. In some embodiments, any image may be used, even when taken by a camera with no sensors or images taken with an uncalibrated camera. In some embodiments, a pose matrix may be determined based on the sensor data and/or other data. A pose matrix can specify translation and rotation information relating to a camera device.

For images taken without sufficient calibration, or for images in which the calibration scheme is unknown, the three-dimensional coordinates may be determined by augmenting an auto-calibration scheme. For example, line correspondences or vanishing points may be used. Line correspondences may be used in similar ways as those described by Richard Hartley, "Projective reconstruction from line correspondences," 1994 and/or Faugeras and Mourrain, "On the geometry and algebra of point and line correspondences between N images," 1995 (herein incorporated by reference). Vanishing points may be used in similar ways as those described by Cipolla, Drummond, Robertson, "Camera calibration from vanishing points in images of architectural scenes," 1999 and/or Caprile, "Using vanishing points for camera-calibration," 1990 (herein incorporated by reference).

Figure 1:
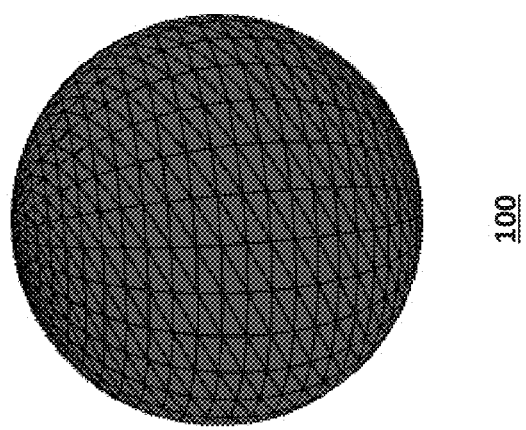
FIG. 1 is an illustration depicting a sample object, according to some embodiments.

FIG. 1 shows a sample view of an object. In some embodiments, a three-dimensional shape 100 (e.g., such as a sphere) can be shown, but when an image frame is taken of the three-dimensional sphere, a two-dimensional (2D) circle (i.e., a sphere in two dimensions) may be displayed. When the sphere is viewed by the human eye, the brain may use a variety of factors, such as shadows, depth perception, prior knowledge, and the like, to determine that the object is a sphere. In embodiments of the present disclosure, when a camera views the sphere, the camera may detect a two-dimensional view. Applying an edge detection filter can thus yield a circle shape. As a camera (e.g., an observer) moves around the object over time, a plurality of frames can be taken over time, and the edges of the object (i.e., of the sphere) at the particular camera location can be detected in each frame. The object edges can correspond to the contour of the object at that point in time, from the known camera position. Assembling the determined contours can then be used to form a plurality of 3D coordinates that form the three-dimensional model of the object. In the sphere example above, it can be determined that the edges of the object form a circle when viewed from various angles, and when those circles are put together, taking into account at various angles based on the coordinates and vectors, a three-dimensional sphere is formed.

Figure 2:
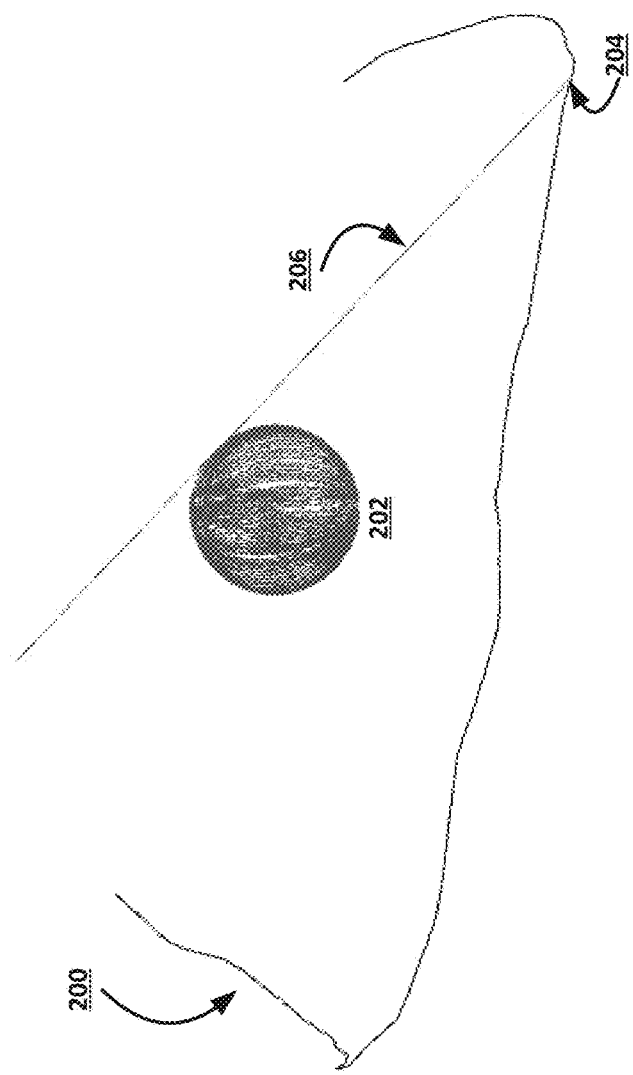
FIG. 2 is an illustration depicting a path of an observer around the object of FIG. 1, one example visual ray from the observer to a point on the contour, and example points of the object that are reconstructed, according to some embodiments.
Figure 3:
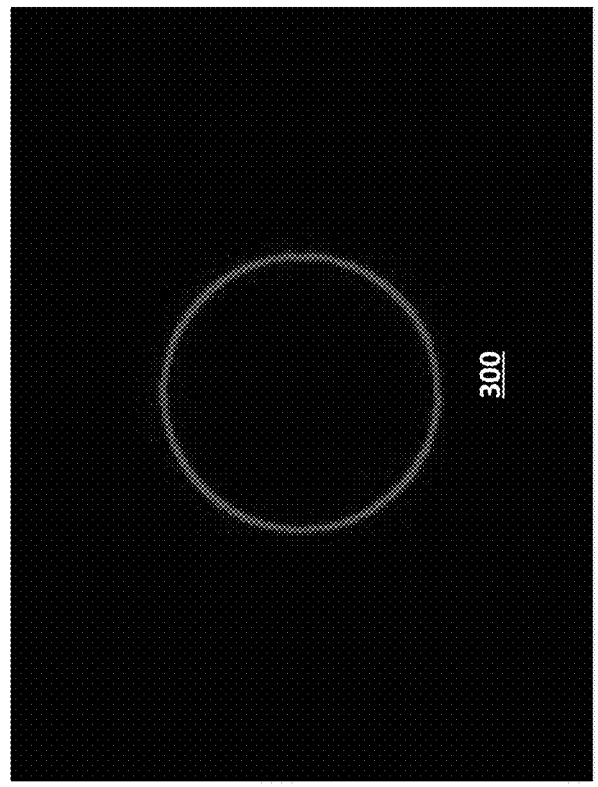
FIG. 3 is an illustration of an example contour in one frame, according to some embodiments.
Figure 4:
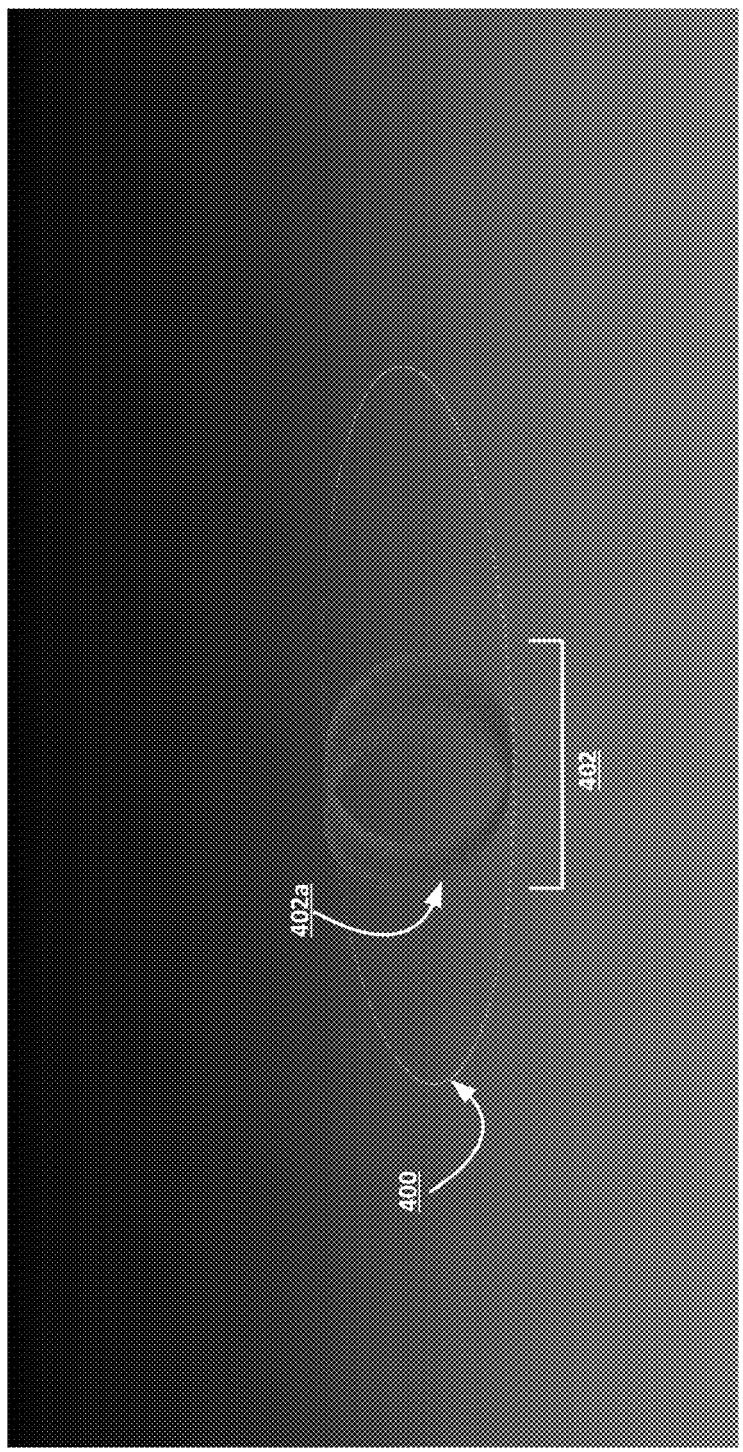
FIG. 4 is an illustration of example contours projected onto the viewing planes over time in space, according to some embodiments. The outer circle is the points in space where the observer collected frames of images.

An example process is further outlined in FIG. 2. For example, in some embodiments, an observer (e.g., a camera) can follow a path corresponding to line 200. At each point 204 along the path (e.g., at specified times on the path 200, and/or the like) the observer can capture an image and/or frame of an object that is viewable by the observer. Using the frame at that point and/or time 204, the observer (and/or a processing device operatively coupled to the observer, such as a server and/or electronic device) can determine a contour (i.e., edge) of the object 202 in view of the camera, e.g., based on a visual ray 206 (e.g., akin to a "line of sight" for a particular contour) from the camera's perspective. Said another way, the observer can generate a frame at a particular time 204, the frame including an image of the object 202 at an angle specified based on the visual ray 206 of the observer at that time. The observer, and/or a separate processing device, can calculate a contour of the object in the frame, based on identifying an outline of the object 202 within that frame. An example contour of the sphere 202 at time A1 204 is shown in FIG. 3 (e.g., contour 300). This process can be repeated for a plurality of frames taken along the noted path 200. Each frame in the plurality of frames can be assembled according to embodiments of the present disclosure, to produce a 3D model of the sphere 202. FIG. 4 is an illustration of example contours projected onto the viewing planes over time in space. For example, an example path 400 around an object (e.g., a sphere) can be derived based on movements by an observer and/or camera device around the object. At each point in the example path, a camera can take a picture of the object, and the observer and/or a server can generate a contour 402a of the object. The collective set of contours 402, when positioned in 3D space, can form a 3D wireframe of the object, as observed through the camera. In some implementations, when the observer and/or server have not received enough images from a camera to generate contours for a full 3D wireframe, the observer and/or server can extrapolate from the existing contours to estimate the shape of the remaining portions of the object.

Figure 6:
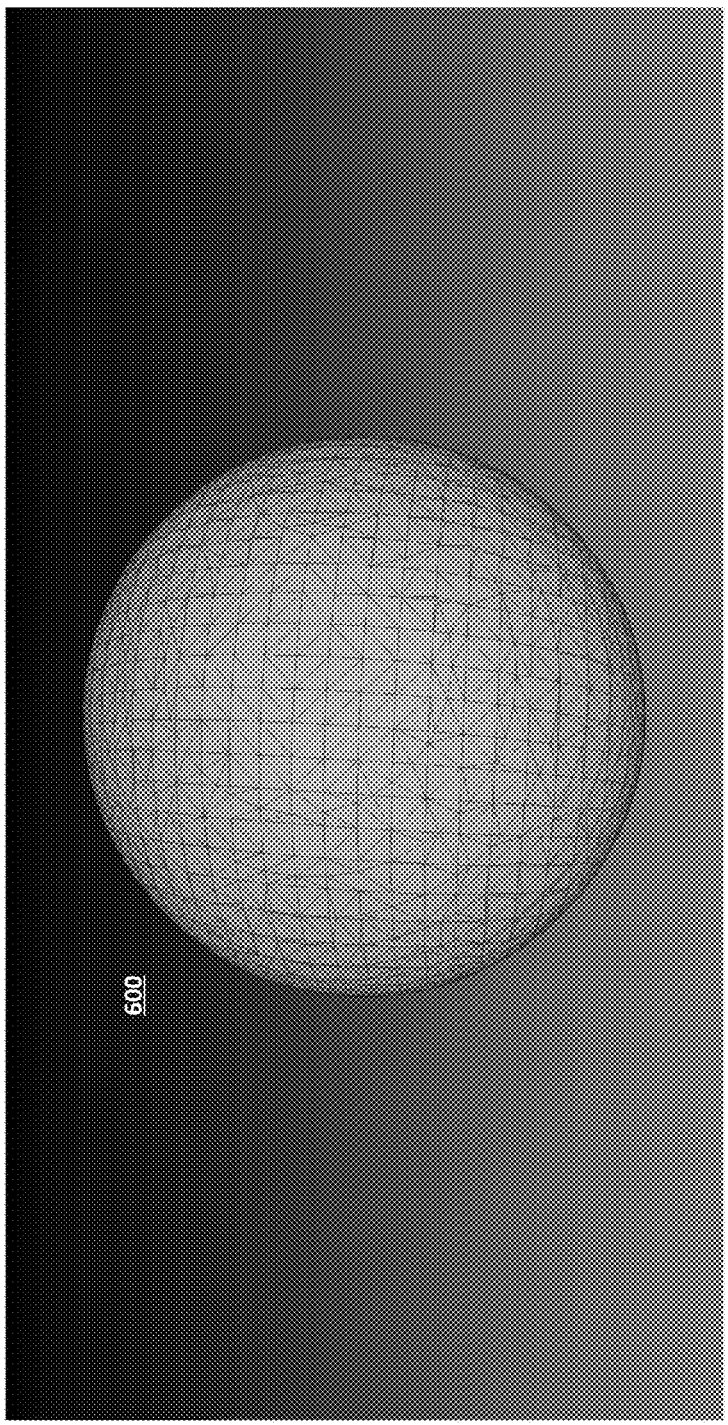
FIG. 6 is an illustration of an example mesh corresponding to the object of FIGS. 1 to 5 constructed with reconstructed points and normal vectors data, according to some embodiments.

FIG. 5 is an example illustration of the detail of reconstructed points of the sphere obtained from the plurality of contours, and FIG. 6 is an illustration of a mesh 600 generated using the points of FIG. 5, and normal vectors to those points. In some embodiments, to generate the reconstructed points and the resulting mesh 600, the camera parameters, combined with the coordinates of the contour points (i.e., the combination of the three-dimensional coordinates that determine the boundary points and/or edges of an object 202), are used to form coordinates of visual rays—. A server and/or similar processing device can calculate a given visual ray at a given time, by using principal component analysis or multiple linear regression on the coordinates of the contour points and camera parameters, to produce a list of basis vectors for the tangent space of the collection of proximate visual rays. The first basis vector in the collection of basis vectors (also referred to herein as the principal basis vector) can be referred to as B. Epipolar numbers $E_{ij}$ may then be computed using the following:

$$E_{ij} = -(B \wedge B)S_{ij} + 2(S \wedge B)B_{ij}$$

$$S = A \wedge T$$

where A is the position of the camera and T is a tangent vector for the contour in the visual plane represented in spatial coordinates. In some embodiments, A, the position of the camera, may be determined from the camera parameters.

Line coordinates, $L_{ij}$ may be computed with the formula:

$$L = A \wedge C$$

where C is the contour point in the viewing plane lying on the given visual ray. A line-based epipolar matrix may be computed from these values based on the formula:

$$M_{ij} = L_i E_j - L_j E_i.$$

Three-dimensional coordinates of a point P on a given visual ray may then be computed:

$$P_1 = (M_{16} - M_{25} - M_{34})/(2M_{56})$$

$$P_2 = M_{35}/M_{56}$$

$$P_3 = M_{36}/M_{56}$$

The de-homogenization of the first column of a corresponding matrix corresponds to:

$$\begin{bmatrix} M_{16} - M_{25} - M_{34} & 2M_{24} & -2M_{14} & 2M_{12} \\ -2M_{35} & M_{16} + M_{25} + M_{34} & -2M_{15} & 2M_{18} \\ -2M_{36} & 2M_{26} & -M_{16} - M_{25} + M_{34} & 2M_{23} \\ -2M_{56} & 2M_{46} & -2M_{45} & -M_{16} + M_{25} - M_{34} \end{bmatrix}$$

In some embodiments, the de-homogenization of a linear combination of the columns can be equivalent to results of a de-homogenization of the first column of the epipolar matrix. The homogenization of a row can result in a normal vector. A server and/or similar processing device can also compute a spatial tangent vector that represents a tangent vector of a contour that can be derived from a frame in a particular viewing plane. The spatial tangent vector can be calculated using a finite differences algorithm (e.g., by calculating a direction from a point on the contour to a point on the given visual ray, so as to generate a tangent vector from that point on the contour).

A surface mesh (e.g., as shown in FIG. 6) can be generated using this normal vector and the computed 3D points of the given visual ray. In some embodiments, the computed 3D points may also be referred to as a point cloud, as shown in FIG. 5. For example, a polygon mesh or triangle mesh may be generated with an algorithm such as Poisson surface reconstruction or similar surface reconstruction techniques such as the non-uniform rational B-spline (NURBS) surface models or computer-aided design (CAD) models, using the normal vector and the computed 3D points and/or point cloud.

Depending upon the object to be modeled, the path 200 and corresponding frames collected need not cover the entire object 202 (said another way, the observer need not generate frames for each surface of the object 202). For example, in the case of the sphere 202, the observer can generate a predetermined number of frames that may cover a small, limited path around the object 202, and which may not capture each angle of the object 202. If less than the entire object 202 is captured by frames generated by the observer, or if the plurality of frames and/or contours indicate that the observer captured a limited path around the object 202, the remainder of points may be extrapolated (e.g., by the observer and/or other processing device).

In some embodiments, frames can be acquired asynchronously, and with higher execution priority than other steps and/or calculations. In some embodiments, acquired image frames can be stored in a flexible container (e.g., such as memory hardware and/or virtual memory implemented on hardware, such as a processor) and each contour associated with one of the acquired image frames can be stored in the same, and/or a different, flexible container. In some embodiments, previous data, such as previously acquired images, contours, and the like, can expire (e.g., can be deleted from the flexible container after a predetermined amount of time, after a predetermined amount of data has been stored, and/or the like), so as to improve and/or allow for continuous reconstruction of object(s), including new or additional object(s), as newly acquired image frames are acquired. In some embodiments, parallel processing of the points can improve processing speeds for the contour data.

Figure 7:
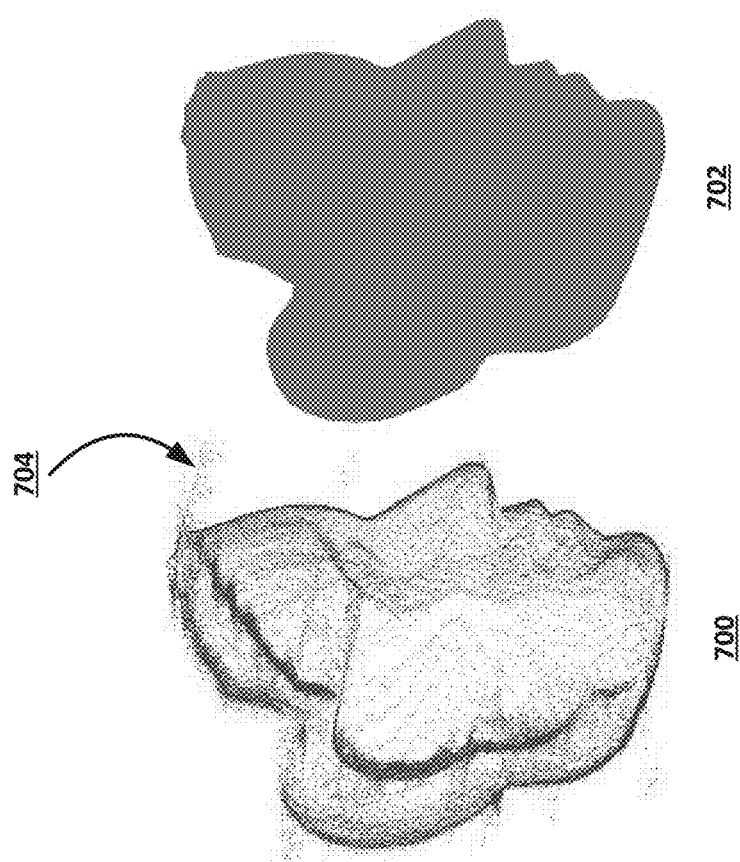
FIG. 7 is an illustration depicting a sample input frame of an object (right) and reconstructed points (left) based on the input, according to some embodiments.
Figure 8A:
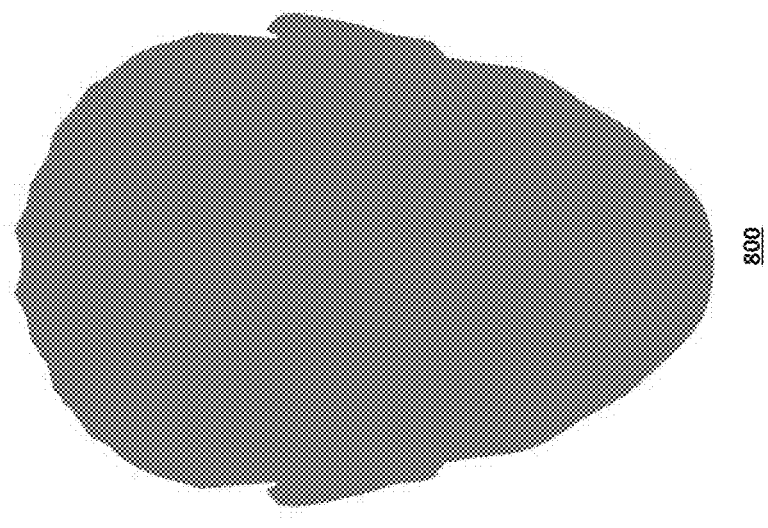
Figure 8B:
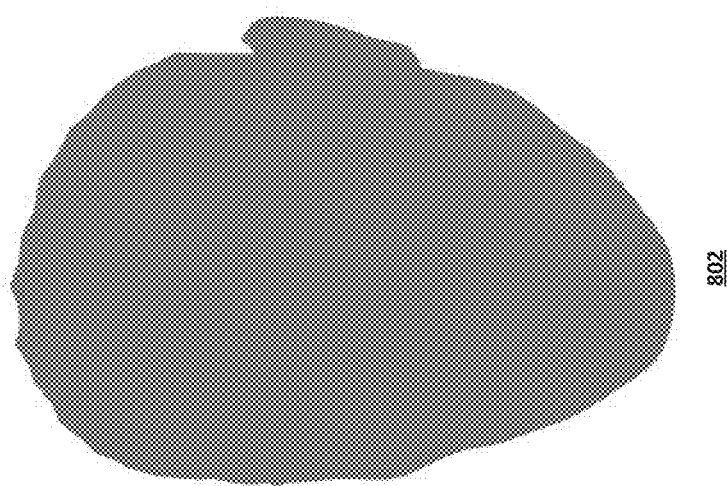
Figure 8C:
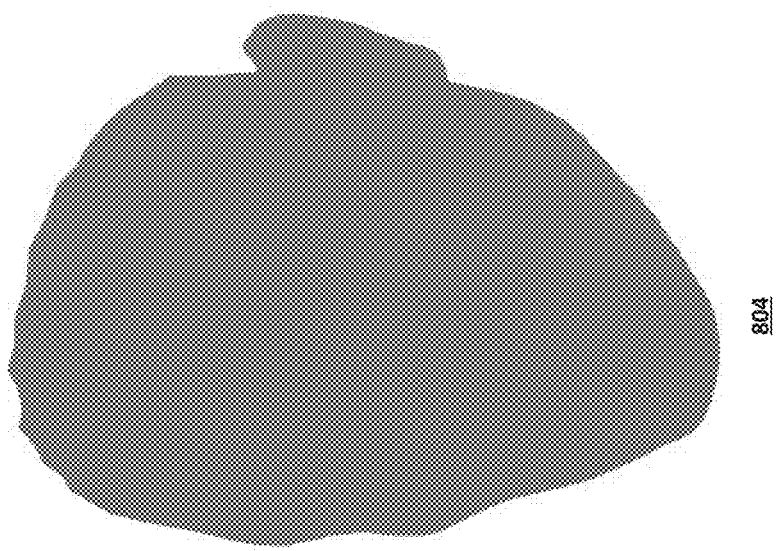
Figure 8D:
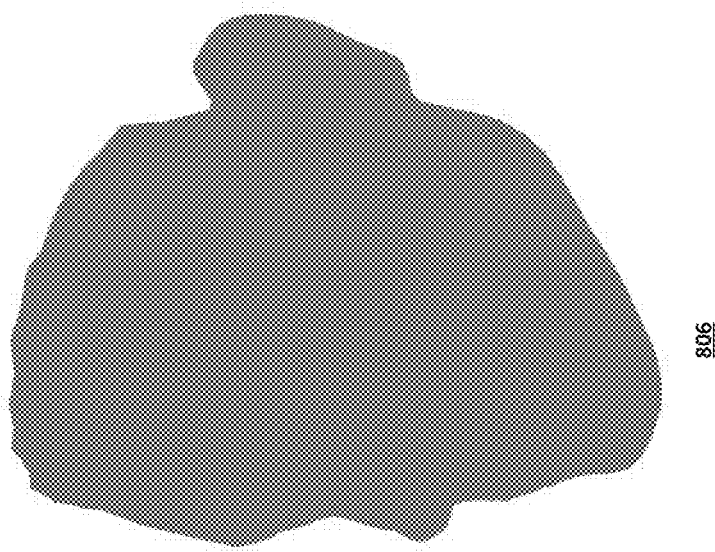
Figure 9A:
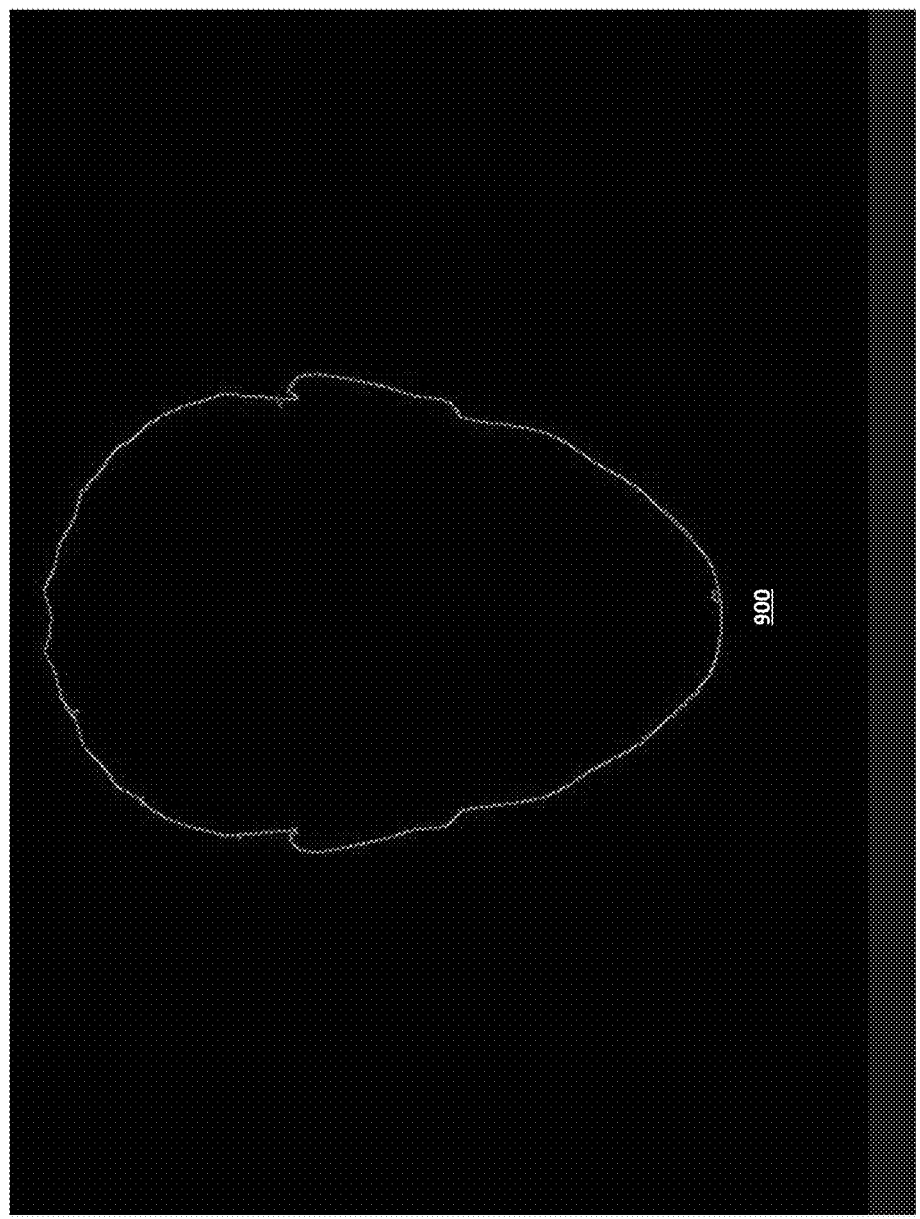
Figure 9B:
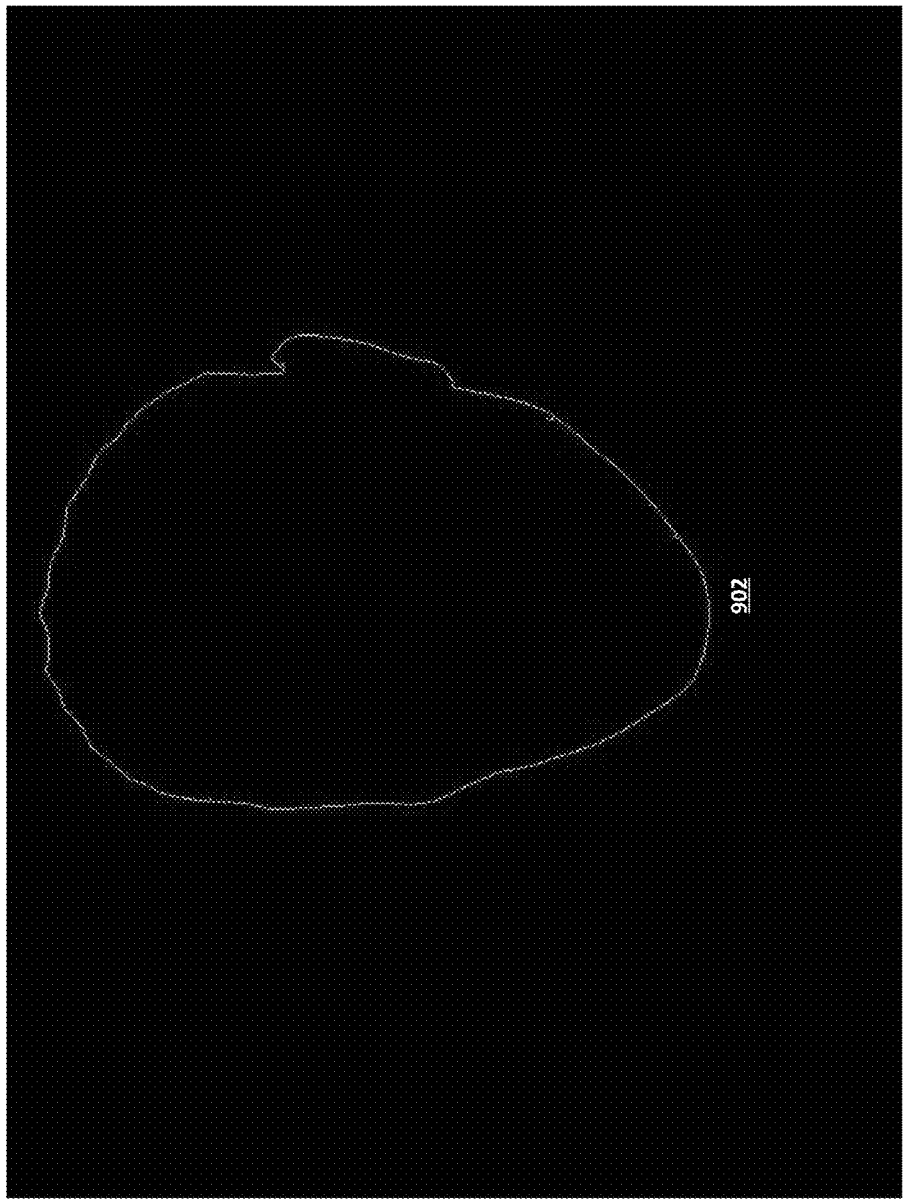
Figure 9C:
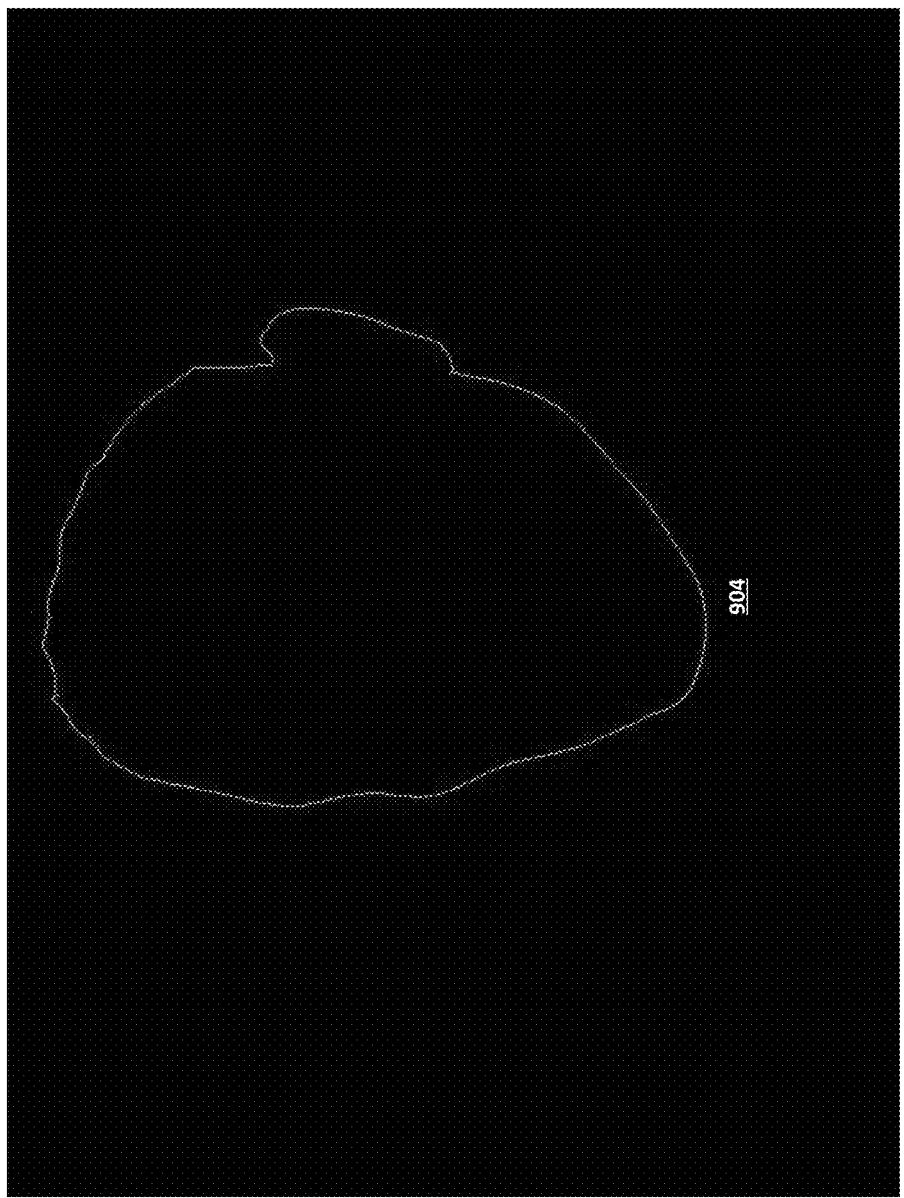
Figure 9D:
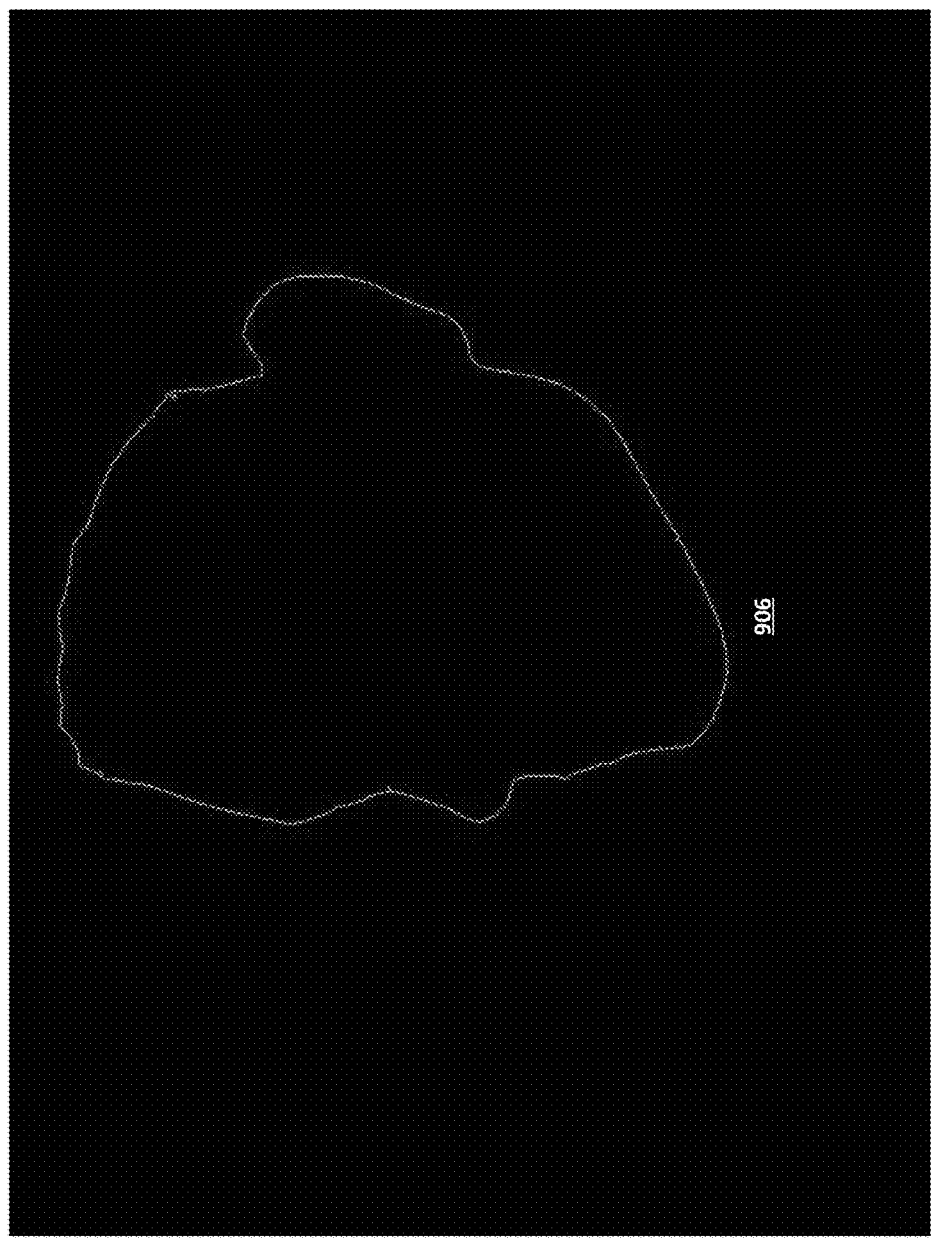
Figure 9E:
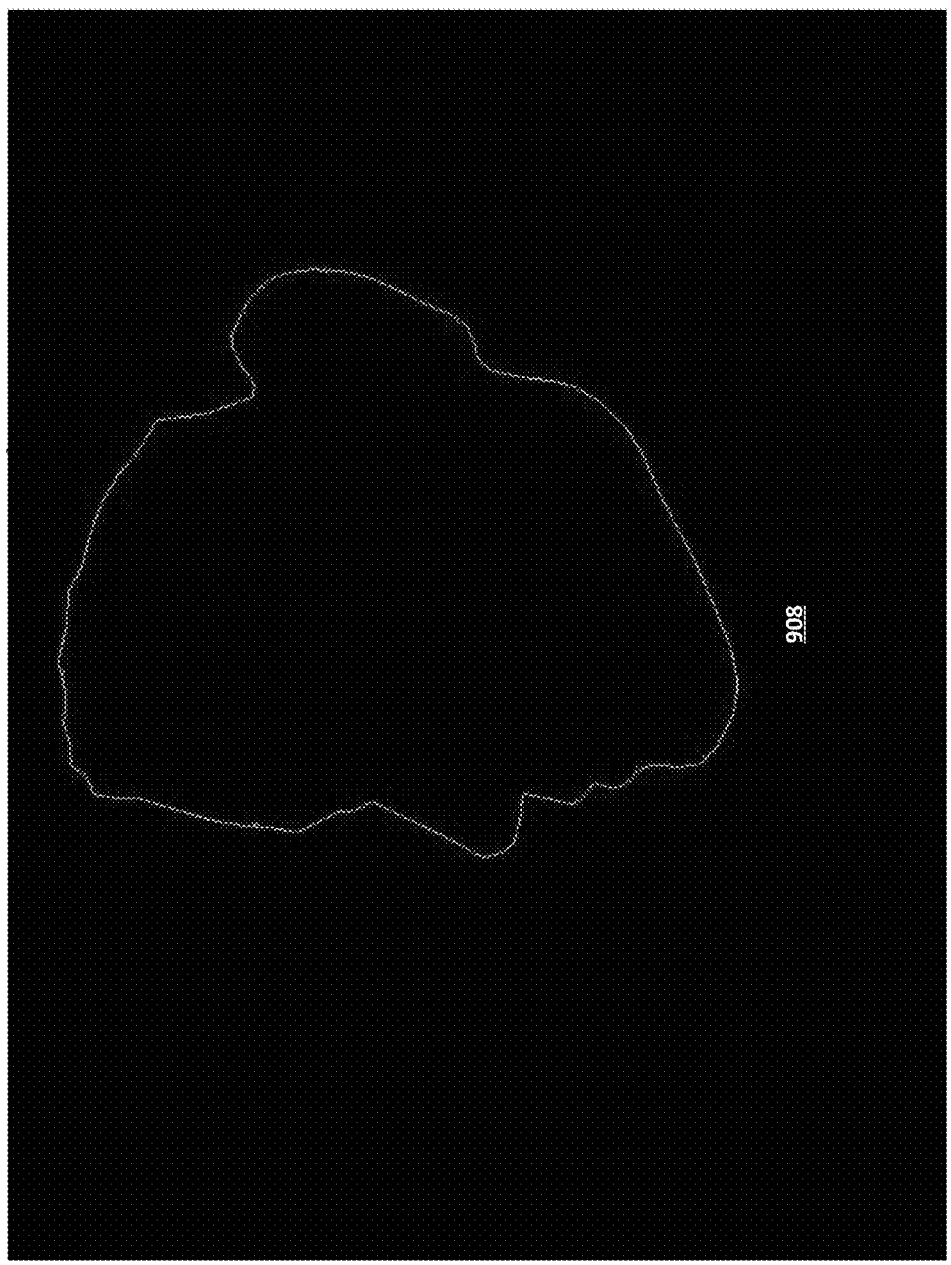

FIG. 7 shows example 3D modelling as applied to a face. For example, in a two-dimensional input frame, the profile/contour of an input object 702 can show the profile of the forehead, brow line, nose, upper lip, lips, chin, and neck. Rotating the input object 702 slightly can yield a slightly different contour and/or profile of the input object 702. The observer and/or server can repeat the process of generating frames based on the input object 702, and generating contours for each frame, along a known path of a camera/observer. Compiling the results together can produce a three-dimensional model 700 of the face.

As shown in FIG. 7, some discontinuities may occur. For example, additional object points 704 may appear at the top of the forehead, at the edge of the ear, and at the tip of the nose, and/or at other portions of the 3D model. In some embodiments, points of discontinuity of the tangent vectors and/or spaces can be screened out by the observer and/or server. For example, determining calculations of the locations of discontinuities of the contours and discontinuities in the contours' apparent velocity can reduce visible errors. As one example, the observer and/or a server can ignore object points and/or vectors that differ from proximate object points and/or vectors by a predetermined deviation threshold, object points and/or vectors that exceed a predetermined value threshold, and/or the like.

FIGS. 8A-E and FIGS. 9A-E example series of frames and contours. FIGS. 8A-E show a series of frames 800-808 that an observer may capture (e.g., of a human face). The observer can capture a series of frames while moving counter-clockwise around a person, so as to capture frames at different angles of the person's face (i.e., can take and/or generate a series of pictures of at least some angles of the person's face). The series of frames may be photos taken by the observer, or the series of frames can be frames extracted from a video feed captured by the observer. FIGS. 9A-E show a series of contours 900-908 that correspond to the frames of FIGS. 8A-E (where frame 800 can be associated with contour 900, and so on). The contour data from each of the frames can be used to reconstruct a model of the face, as described above. For example, each of contours 900-908 can be combined so as to generate a 3D model of the face captured in frames 800-808.

FIG. 10 is a logic flow diagram illustrating computing contours of a space. For example, in some embodiments, an observer can move 1002 around (e.g., in a physical environment). A camera associated with the observer can collect 1004 frames (e.g., can extract frames from a video feed recorded by the observer, and/or can take pictures as the observer moves around) that depict portions of the physical environment. While and/or after the camera has collected frames, sensors associated with the observer (e.g., step sensor, a step counter, a gyroscope, an orientation sensor, GPS, and/or similar sensors) can collect 1010 sensor data. The camera can send the collected frames 1006 to a server and/or similar processing device. Similarly, the sensors can send the collected sensor data 1012 to the server and/or a similar processing device. In some embodiments, the observer can collect the frames and the sensor data from the camera and the sensors, and can send the frames and the sensor data as a package to the server and/or a similar processing device. In some embodiments, the observer can also provide camera calibration data 1014 to the server and/or similar processing device (e.g., where the camera calibration data 1014 can be determined based on the sensor data 1012), along with and/or separate from the frames and/or sensor data.

The server and/or similar processing device can compute 1008 contours for at least one object detected in each received frame, e.g., using the received frames as input to a process similar to that described with respect to FIGS. 2-7. The server and/or similar processing device can also compute 1016 space transformations for the objects detected in the frames, e.g., using the sensor data as input to a process similar to that described with respect to FIGS. 5-6. The server and/or similar processing device can use each of the contours and the space transformations to compute 1018 contour tangents for the at least one object detected in the frames, e.g., using the contours and space transformations as input to a process similar to that described with respect to FIGS. 5-6. The server and/or similar processing device can compute 1020 space contours in a viewing plane, and can also compute space contour tangents, using the contour tangents as input to a process similar to that described with respect to FIGS. 5-6.

Using the space contour tangents, the server and/or similar processing device can calculate 1022 3D points of visual rays and/or of the space contour tangents, and can optionally calculate normal vectors for the space contours. The server and/or similar processing device can then optionally use 1024 the 3D points to construct a 3D model of the physical environment, and can use the 3D model to construct a simulated environment of the physical environment, to calculate navigation parameters for autonomous vehicles, and/or to perform other actions as described herein. In some embodiments, the 3D model need not be calculated; in some embodiments, the 3D points themselves may be used for processes that use data about the characteristics of the physical environment to perform particular actions.

FIG. 10B is a logic flow diagram illustrating computing a high-dimensional neighborhood model for a space. For example, in some embodiments, the observer, camera, and/or server devices can perform each of 1002-1016, similar to FIG. 10B. Instead of computing contour tangents, however, the server and/or similar processing device can compute 1028 a higher-dimensional neighborhood model of the object, based on the contour input and the space transformation input. In some embodiments, a higher-dimensional neighborhood model can be a differential, polynomial regression, and/or an approximation of higher-dimensional data. With respect to a 2D image frame and/or contour, therefore, the higher-dimensional neighborhood model can serve as an approximation of a 3D object represented by the image frame and/or contour. For example, the server and/or similar processing device can use points on the contour input, and/or the space transformation input, to calculate sample 3D points, which can collectively form the higher-dimensional neighborhood model. The higher-dimensional neighborhood model can include both the sample 3D points calculated using the contour input and/or the space transformation, and relationships between the 3D points. The higher-dimensional neighborhood model, as a whole, can represent variance of the visual rays of a given object, based on a camera being at a particular point (i,e, a particular location) at a given time.

The server and/or similar processing device can use the generated higher-dimensional neighborhood model to determine 1030 3D points for generating a 3D mesh representing the object detected in the image frames from the camera. For example, the server and/or similar processing device can select points from the higher-dimensional neighborhood model (e.g., can select 3D points from the higher-dimensional neighborhood model based on a spatial and/or time proximity of the point to a portion of the mesh being generated), and can algebraically calculate contour tangents and/or contour spaces using those points (in a similar manner as discussed with respect to contour points in the discussion of FIGS. 5-6). The server and/or similar processing device can filter 1032 out outlier points (e.g., using a process similar to that described with respect to FIG. 7), and can use the resulting 3D model in a variety of applications. The server and/or similar processing device can also optionally compute 1034 colors and/or textures for the 3D model, e.g., using color information and/or other information extracted from the original image frames from the camera.

FIG. 11 is a logic flow diagram illustrating generating a surface mesh. For example, in some embodiments, a camera can acquire 1102 multiple two-dimensional input frames (e.g., multiple images taken by the camera, and/or extracted from a video recorded by the camera). The camera can send the input frames to a server, such that the server can isolate 1104 a contour of at least one object detected within each input frame. As one example, if the server detects that a person can be detected in each input frame, the server can calculate an outline of the image of the person, within each input frame. The outline can form the contour of the detected person. The server can also calculate 1106 coordinates for one or more visual rays of each contour, e.g., based on calibration parameters. For example, the server can use calibration parameters determined based on sensor data from the camera, along with data points of the contour, to estimate a visual ray of the camera when it captured the input frame from which a particular contour was derived (e.g., using linear regression and/or similar algorithms). Said another way, when the server receives an input frame, the server can calculate a contour, and then estimate a visual ray that represents a position and direction that a camera was facing when it captured the input frame, based on data points of the contour and camera calibration data derived from sensors from the camera.

The server can estimate 1108 a spatial tangent vector for each contour, e.g., using finite differences. For example, the server can estimate a tangent vector of a given contour by calculating a direction from a point on the contour to a point on the visual ray of that contour. Using the spatial tangent vector, the server can estimate 1110 a tangent space of each visual ray, using a process similar to that described in FIGS. 5-6. The tangent space can include a set of basis vectors. The server can use the basis vectors, along with calibration parameters and the spatial tangent vector, to calculate 1112 epipolar numbers of the tangent space. The server can generate 1114 an epipolar matrix using the calculated epipolar numbers, and using the coordinates of one or more visual rays (e.g., visual rays that are associated with, and/or proximate to, the tangent space). The server can de-homogenize 1116 the column space of the epipolar matrix so as to derive a set of 3D object points that can be used to generate a 3D model.

FIG. 12 is a data flow illustrating observing devices, a server device. In some embodiments, image frames may be collected via a camera device 1200. The camera device 1200 can be one of a camera on a smart phone, a digital camera, a video camera, and/or the like. The camera device 1200 can include at least one processor, at least one memory, at least one display, at least on image capturing apparatus, and/or similar components. In some embodiments, the at least one processor (not shown) can be any hardware module and/or component that can receive and process data, and/or to execute code representing executable instructions. In some embodiments, the at least one processor can be a general purpose processor, a Field Programmable Gate Array (FPGA), an Application Specific Integrated Circuit (ASIC), a Digital Signal Processor (DSP), and/or the like. The at least one memory (not shown) can be a hardware module and/or component operatively coupled to the at least one processor, and can store data accessible by the at least one processor, and/or store code representing executable instructions for the at least one processor. The memory can be, for example, a random access memory (RAM), a memory buffer, a hard drive, a database, an erasable programmable read-only memory (EPROM), an electrically erasable read-only memory (EEPROM), a read-only memory (ROM) and/or so forth. In some embodiments, the memory can store instructions to cause the processor to execute modules, processes and/or functions so as to capture image frames and/or other information. In some implementations, an observer device (not shown) can optionally be operatively coupled to the camera device 1200, and can send instructions to the camera device 1200 to collect frames and/or to perform other actions. The observer device may include at least one memory and at least one processor that are similar to the at least one memory and/or at least one processor of the camera device 1200. The observer device can also facilitate communication between the camera device 1200 and other electronic devices.

In some embodiments, image frames captured by a camera can be sent to a server 1202 and/or a similar processing device (e.g., such as a personal computer, a tablet device, and/or similar electronic devices). The server 1202 and/or similar processing device can also include at least one processor and/or at least one memory, the at least one processor and/or at least one memory being similar to the at least one memory and/or at least one processor of the camera device 1200. The server 1202 and/or similar processing device can be configured to receive image frames, and to use the image frames to calculate contours, visual rays, spatial tangent vectors, and/or other information for generating a 3D model. The server 1202 and/or similar processing device can use the information to generate a 3D model, and/or to calculate 3D coordinates that can be used for various applications, such as modelling a physical space, autonomous vehicle navigation, and/or other applications described herein.

In some embodiments, the server 1202 and/or similar processing device can send a generated 3D model, and/or data calculated using the generated 3D model, to an output device 1204 (e.g., including but not limited to a 2D and/or 3D printer, a monitor, screen, and/or similar electronic display, and/or similar output devices). The output device can be configured to display, render, print, and/or generate a physical representation of the calculated 3D model, and/or to display, render, print, and/or generate a physical representation of data derived by using the 3D model, and/or 3D coordinates, in various applications.

Applications

While methods, apparatuses, and systems herein have generally been described above as being used to generate 3D models of people and/or human features, it should be understood that 3D models and/or 3D coordinates generated using the methods, apparatuses, and systems herein may be used for a variety of applications, including but not limited to autonomous vehicle navigation, obstacle avoidance for automated machines such as robots, 3D scanning of a physical environment and generating virtual simulations of physical environments, and/or other such applications. Example applications are further described below.

Autonomous Vehicle Navigation

In some embodiments, one and/or another of the above-noted embodiments may be used in autonomous vehicle navigation to detect/model one or more, and preferably, all objects in the vicinity of the vehicle. The modeled objects may be constructed using the embodiments noted above, so as to determine structures in a quick-changing, immediate environment as the vehicle travels through the environment. In such embodiments, at least one camera (which may be or include thermal, textural and color functionality) may be attached to the body of a vehicle configured to capture real-time video. Additional sensors can be used to obtain camera location including, for example, speed sensors, steering angle sensors, brake position sensors, GPS sensors, accelerometers, and/or the like. Such sensors may be included with the camera or may be part of the vehicle, and may be linked with either a dedicated hardware controller or to the vehicle's main computer, which may perform calculations to determine the object coordinates and generate the reconstruction.

In some embodiments, multiple cameras may be used: one or more cameras may be directed towards the immediate vicinity of the vehicle, and one or more cameras may be directed towards areas that are determined to be in the expected near-future location of the vehicle. This determination may be based on the trajectory of the vehicle and/or other information from the sensor(s). Objects determined to be in the immediate vicinity and/or in the expected near-future location of the vehicle may be given priority for modeling, and may be modeled before other objects. For example, an object such as a sidewalk curb or stop sign that is on the side of the road may be prioritized over a building that is set back from the edge of the road.

The trajectory of the vehicle may be computed based on GPS data (for example). Since GPS is limited in accuracy (e.g., 10 meters), the trajectory may be refined based on data from one or more additional sensors (see above), which can refine the accuracy to the sub-meter range (e.g., centimeter range). For example, the refined trajectory may be accurate within about 10 centimeters, within about 1 centimeter, within about 5 millimeters. The refined trajectory may be further refined using camera-based auto-calibration methods. The auto-calibration methods may focus on prominent lines or corners in visual images, as described above.

The modeled object information can be made immediately available to the vehicle's main computer, which may assist in obstacle-avoidance and driver and/or occupant warning systems. The object information may also assist the decision tree for yielding to traffic signals, such as stop signs, and passing other vehicles.

In some embodiments, some objects may be stored for scene reconstruction, self-orientation validation, and/or the like. Objects that have previously been reconstructed may be stored so that the vehicle can recognize previously reconstructed areas and/or objects. For example, the information for reconstructing a stop sign may be stored, such that stop signs can be recognized more quickly. In another example, reconstruction of a specific (e.g., home) neighborhood may be stored and later recognized. The reconstruction may be performed and compared to the previously stored reconstruction, so as to allow reconstruction of new objects and/or obstacles that may have changed. For example, if a tree branch fell due to a recent storm, the reconstruction will detect the tree branch, while recognizing regular features of the vehicle owner's neighborhood.

The noted embodiments for autonomous vehicle navigation may also be used for real time terrain mapping (e.g., for aircraft), so as to improve obstacle warning systems (e.g., small aircraft operating at low altitudes).

Robot Locomotion: Climbing Stairs, Avoiding Objects

Real-time object modeling/reconstruction using functionality described above (e.g., with respect to autonomous vehicle navigation), may be used to improve the ability of robots to climb stairs and/or avoid obstacles. Specifically, real-time reconstruction and/or memory may allow a robot to observe height and small obstacles. This information can be processed and the robot may be able to use the object points to walk over and/or around the small obstacles, including walking up stairs.

Industrial Robotics

Using the 3D modeling/reconstruction functionality described above can be used to enhance the ability of robots/robotic arms to locate and determine the size and/or orientation of an object. For example, one or more cameras can be mounted to view an area of the industrial facility, and images of the area can be acquired by a calibrated camera. The camera calibration parameters can include the position of the camera, as well as known specifications of the industrial activity being monitored and/or assisted by the robotic arm. For example, for a robotic arm configured to orient widgets on a conveyor, the parameters may include the speed of the conveyor, size of the widgets, and/or the like. Determining the object points of the widgets can provide information including the precise location, orientation, and structure of the widgets. This information can be processed and a determination can be made as to the best trajectory for the robotic arm to approach, grasp, reorient, and/or relocate the widgets for further processing.

3-D Scanning

Real-time structure from motion technology can be used to create a three-dimensional scan of an object. Coupling the 3-D scan with existing 3-D printing technology may allow for printing duplicate parts, tools, or other objects. Furthermore, scans of existing objects could be modified and the modified objects could be printed. This scan could be done using any imaging technology, including the camera on a smartphone, as described above. This may allow for rapid prototyping, not only by designers and engineers, but also by at-home users. Three-dimensional scanning can also be used for facial signature capturing, for individual identification, and/or security purposes.

In some embodiments, a three-dimensional scanner may include a surface-mounted housing and/or a codestrip, which may be mounted on a table, such as a plastic table. The housing and/or codestrip may be arranged in a circular arc. The circular arc may complete an entire circle, or the circular arc may comprise less than entire circle, e.g. about 180°, just over 180°, about 120°, and the like. The circular arc may have a radius of about one foot, about two feet, about three feet, about a half foot, or the like. In some embodiments, the material that forms the arc may be adjustable to different radii, and may therefore also create different arc lengths depending on the radius.

The three-dimensional scanner may also include a rolling combination smartphone mount. The mount may include a USB attachment containing an optical encoder. The optical encoder may detect the position along the codestrip. The mount may also include a USB device controller. The USB device controller may allow for communications with the smartphone. In some embodiments, different connectors may be used, such as lightning connectors for iPhones, and the like.

In some embodiments, three-dimensional scans may be taken of larger views, such as landscapes. The scans may be taken with any camera, as described above, including a smartphone.

Three-dimensional scans may be taken in color, and the color three-dimensional scans may be filtered by color. Filtering by color may allow for three-dimensional reconstruction in color, thus determining each color layer with single or multiple colors.

In some embodiments, designers, animators, and artists can use three-dimensional data for source material. For example, this can allow designers, animators, and artists to design shapes and logos for objects of varied shapes. Additionally, game designers, engineers, and architects may use three-dimensional data to build products. Real-life backgrounds and environments can be created using real data.

Medical professionals can also use three-dimensional scans for experimentation and scanning true anatomy of a patient. This allows for scans of shapes of bones, teeth, and the like. This also allows medical professionals to scan the actual shape and size of various organs, tissues, joints, and the like, and can be used, for example, to recreate a patient's anatomy in order to simulate a difficult surgery.

Additionally, retailers can use three-dimensional data to better display their products. In some embodiments, consumers may be able to create scans of their own bodies, for example, using their own smartphone and/or their own camera. This may allow retailers to provide an online shopping environment in which consumers can see how clothing will fit their bodies before purchasing.

Crowd Sourcing

As explained above, data from different devices may be used, which may allow images to be sourced from social and cloud applications using images from different people taken at different times. Images and location data may be contributed by participants, including users possessing camera- and GPS-enabled smartphones. The images and corresponding data can be uploaded to or collected by a server (which may be off-site). Each frame can be processed, as described above, and the 3D points may be determined and/or a model may be created.

In some embodiments, collective intelligence may be used such that any image with location and camera calibration (e.g., including camera orientation) can be uploaded at any time. Previous results may be refined with these new images, which may achieve higher and higher precision. Alternatively, the new results may be compared with previous results in order to show changes over time.

This may also be used to recreate 3D points and/or a model by collecting images from a variety of frames taken by different users using different cameras/smartphones. For example, each user may only have one or two photos of an object, but other users may have photos and/or videos of other angles of the object, and, by combining and incorporating each of the frames, it may be possible to collect enough input frames in order to determine the 3D points and/or model.

Various inventive concepts may be embodied as one or more methods, of which one or more examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

At least some of the embodiments disclosed above, in particular at least some of the methods/processes disclosed, may be realized in circuitry, computer hardware, firmware, software, and combinations thereof (e.g., a computer system). Such computing systems, may include PCs (which may include one or more peripherals well known in the art), smartphones, specifically designed medical apparatuses/devices and/or other mobile/portable apparatuses/devices. In some embodiments, the computer systems are configured to include clients and servers. A client and server are generally remote from each other and typically interact through a communication network (e.g., VPN, Internet). The relationship of client and server arises by virtue of computer programs running on the respective computers and having a client-server relationship to each other.

Some embodiments of the disclosure (e.g., methods and processes disclosed above) may be embodied in a computer program(s)/instructions executable and/or interpretable on a processor, which may be coupled to other devices (e.g., input devices, and output devices/display) which communicate via wireless or wired connect (for example).

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be an example and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, and/or method described herein. In addition, any combination of two or more such features, systems, articles, materials, and/or methods, if such features, systems, articles, materials, kits, and/or methods are not mutually inconsistent, is included within the inventive scope of the present disclosure. Still other embodiments of the present disclosure are patentable over prior art references for expressly lacking one or more features disclosed in the prior art (i.e., claims covering such embodiments may include negative limitations).

Any and all references to publications or other documents, including but not limited to, patents, patent applications, articles, webpages, books, etc., presented anywhere in the present application, are herein incorporated by reference in their entirety. One or more features and/or embodiments disclosed in one or more of incorporated by reference documents herein can also be combined with one or more features/embodiments of the present disclosure to yield yet further embodiments (of the present disclosure).

Moreover, all definitions, as defined and used herein, should be understood to control over dictionary definitions, definitions in documents incorporated by reference, and/or ordinary meanings of the defined terms.

What is claimed is:

1. A method for constructing surface patches and curve segments from a plurality of two-dimensional images to generate a three-dimensional model, the method comprising:
   acquiring a plurality of two-dimensional input frames via a camera, wherein the camera is associated with one or more calibration parameters;
   isolating a contour of at least one object contained within each input frame;
   calculating coordinates of one or more visual rays corresponding to each contour in a direction specified by at least one of the calibration parameters;
   estimating a spatial tangent vector of each contour using finite differences;
   estimating a tangent space of the visual rays at each of the one or more visual ray;
   calculating epipolar numbers based on basis vectors of the tangent space, the one or more calibration parameters, and the spatial tangent vector;
   forming a line-based epipolar matrix using the epipolar numbers and line coordinates;
   de-homogenizing the column space of the line-based epipolar matrix into three-dimensional object points; and
   generating a three-dimensional model based on the three-dimensional object points.

2. The method of claim 1, further comprising determining the calibration parameters, wherein the calibration parameters are determined using an auto-calibration scheme.

3. The method of claim 1, wherein the calibration parameters are determined from at least one of one or more global-positioning sensors and one or more gyroscopes associated with the camera.

4. The method of claim 1, further comprising determining the calibration parameters, wherein the calibration parameters are determined according to information output from at least one of one or more gyroscopes associated with the camera and an active local sensor network.

5. The method of claim 1, further comprising determining the calibration parameters, wherein the calibration parameters are determined according to information output from at least one of: a step sensor, a step counter, a gyroscope, an orientation sensor, and a global-positioning sensor.

6. The method of claim 1, wherein each contour is obtained via an edge detection filter.

7. The method of claim 6, wherein the edge detection filter comprises a Canny filter.

8. The method of claim 1, wherein each contour comprises a boundary between at least one of colored regions and textured regions of a surface of the object.

9. The method of claim 1, wherein each contour comprises at least one edge of a surface of the object in each two-dimensional input frame.

10. The method of claim 1, further comprising screening out points of discontinuity of each special tangent vector.

11. The method of claim 1, further comprising screening out points of discontinuity of the tangent space.

12. The method of claim 1, wherein estimating the tangent space of the visual rays comprises determining finite differences.

13. The method of claim 1, wherein estimating the tangent space of the visual rays further comprises performing principal component analysis.

14. The method of claim 1, wherein estimating the tangent space of the visual rays further comprises performing multiple linear regression.

15. The method of claim 1, wherein the two-dimensional input frames comprise a sequence of frames of video data.

16. The method of claim 15, wherein the sequence of frames of video data is captured within a three-dimensional environment.

17. A method for autonomous vehicle navigation comprising collecting a plurality of images around the vicinity of the vehicle, and, substantially in real-time with the collecting of images, processing the images and reconstructing objects in 3D within the vicinity and/or soon to be vicinity, the method comprising:
    acquiring a plurality of two-dimensional input frames via a camera, the input frames comprising the plurality of images around the vicinity of the vehicle, wherein the camera is associated with one or more calibration parameters;
    isolating a contour of at least one object contained within each input frame;
    calculating coordinates of one or more visual rays corresponding to each contour in a direction specified by at least one of the calibration parameters;
    estimating a spatial tangent vector of each contour using finite differences;
    estimating a tangent space of the visual rays at each of the one or more visual ray;
    calculating epipolar numbers based on basis vectors of the tangent space, the one or more calibration parameters, and the spatial tangent vector;
    forming a line-based epipolar matrix using the epipolar numbers and line coordinates;
    de-homogenizing the column space of the line-based epipolar matrix into 3D object points; and
    generating a 3D model based on the 3D object points.

18. A method for robotic movement/locomotion comprising collecting a plurality of images around the vicinity of a robot, and, substantially in real-time with the collecting and/or processing of the images, reconstructing objects in 3D within the vicinity and/or soon to be vicinity, the method comprising:
    acquiring a plurality of two-dimensional input frames via a camera, the plurality of two-dimensional input frames comprising the plurality of images around the vicinity of the robot, wherein the camera is associated with one or more calibration parameters;
    isolating a contour of at least one object contained within each input frame;
    calculating coordinates of one or more visual rays corresponding to each contour in a direction specified by at least one of the calibration parameters;
    estimating a spatial tangent vector of each contour using finite differences;
    estimating a tangent space of the visual rays at each of the one or more visual ray;
    calculating epipolar numbers based on basis vectors of the tangent space, the one or more calibration parameters, and the spatial tangent vector;
    forming a line-based epipolar matrix using the epipolar numbers and line coordinates; and
    de-homogenizing the column space of the line-based epipolar matrix into 3D object points; and
    generating a 3D model based on the 3D object points.

19. A method for 3D scanning comprising collecting a plurality of images along an image path around an object, and, substantially in real-time with the collecting and/or processing of the images, reconstructing objects in 3D, the method comprising:
    acquiring a plurality of two-dimensional input frames via a camera, the image frames comprising the plurality of images along the image path around the object, wherein the camera is associated with one or more calibration parameters;
    isolating a contour of at least one object contained within each input frame;
    calculating coordinates of one or more visual rays corresponding to each contour in a direction specified by at least one of the calibration parameters;
    estimating a spatial tangent vector of each contour using finite differences;
    estimating a tangent space of the visual rays at each of the one or more visual ray;
    calculating epipolar numbers based on basis vectors of the tangent space, the one or more calibration parameters, and the spatial tangent vector;
    forming a line-based epipolar matrix using the epipolar numbers and line coordinates; and
    de-homogenizing the column space of the line-based epipolar matrix into 3D object points; and
    generating a 3D model based on the 3D object points.

20. A method for determining three-dimensional coordinates of an object from a plurality of two-dimensional images comprising:
    acquiring a plurality of two-dimensional input frames along a path;
    acquiring one or more parameters of the camera so as to locate the camera relative to one or more objects contained in the frames;
    isolating a contour of at least one object contained within each input frame along one or more visual rays;
    determining 3D points of each contour of the object, and normal vectors at the 3D points, based on the plurality of contours and additionally on one or more of the parameters, wherein said determining comprises:
        calculating epipolar numbers based at least in part on basis vectors and the one or more parameters,
        forming a line-based epipolar matrix using the epipolar numbers and line coordinates, and
        de-homogenizing the column space of the line-based epipolar matrix to determine the 3D points; and
    reconstructing a model of the object using the 3D points and optionally the normal vectors.

* * * * *